(12) United States Patent
Bozio et al.

(10) Patent No.: US 10,077,003 B2
(45) Date of Patent: *Sep. 18, 2018

(54) VEHICLE INTERIOR COMPONENT

(71) Applicant: Shanghai Yanfeng Jinqiao Automotive Trim Systems Co., Ltd, Plymouth, MI (US)

(72) Inventors: Ronald Bozio, Holland, MI (US); Craig D Flowerday, Holland, MI (US); Scott Hansen, Holland, MI (US); Jason M Hipshier, Hudsonville, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/242,137

(22) Filed: Aug. 19, 2016

(65) Prior Publication Data

US 2016/0355110 A1    Dec. 8, 2016
US 2017/0267135 A9    Sep. 21, 2017

Related U.S. Application Data

(63) Continuation of application No. 14/414,605, filed as application No. PCT/US2013/050320 on Jul. 12, 2013, now Pat. No. 9,457,697.

(Continued)

(51) Int. Cl.
*B60R 7/04* (2006.01)
*B60N 2/75* (2018.01)

(52) U.S. Cl.
CPC ............... *B60R 7/04* (2013.01); *B60N 2/773* (2018.02); *B60N 2/793* (2018.02)

(58) Field of Classification Search
CPC .... B60N 2/4646; B60N 2/4686; B60N 2/773; B60N 2/793; B60R 7/04

(Continued)

(56) References Cited

U.S. PATENT DOCUMENTS 5,752,740 A * 5/1998 Volkmann ................. B60R 7/04
                                                  297/188.19
5,845,965 A * 12/1998 Heath ....................... B60N 2/77
                                                  297/188.19

(Continued)

FOREIGN PATENT DOCUMENTS

CN    2655735 Y    11/2004
CN    1576106 A     2/2005

(Continued)

OTHER PUBLICATIONS

First Office Action from the State Intellectual Property Office of the People's Republic of China for Application No. 201380047609.8 dated Apr. 26, 2016 (with English translation).

(Continued)

*Primary Examiner* — Jason S Morrow (57) ABSTRACT

A vehicle interior component providing a support structure such as an adjustable vehicle armrest may be configured to allow for sliding movement between a retracted position and an extended position to adjust armrest length as desired by the vehicle occupant. A cover such as a tambour door may be provided over at least part of the support structure/armrest and may be opened and closed to allow access to storage within the armrest/support structure. The armrest may be supported by structure such as rails (e.g. sliding/translating rails); a set of tracks may be provided to facilitate movement and provide support for the cover (e.g. tambour door) as the armrest is moved between the retracted position and extended position.

20 Claims, 6 Drawing Sheets

Related U.S. Application Data (60) Provisional application No. 61/671,376, filed on Jul. 13, 2012.

(58) Field of Classification Search
USPC .................................. 296/24.34, 37.8, 37.15
See application file for complete search history.

(56) References Cited

U.S. PATENT DOCUMENTS

| | | | |
|---|---|---|---|
| 6,719,367 B2 | 4/2004 | Mic et al. | |
| 7,278,681 B2 * | 10/2007 | Lilov ........................ | B60R 7/04 297/188.17 |
| 8,235,442 B2 * | 8/2012 | Spitler ...................... | B60R 7/04 296/24.34 |
| 8,528,956 B1 * | 9/2013 | Winiger .................... | B60R 7/04 296/24.34 |
| 8,585,150 B2 * | 11/2013 | von Rothkirch und Panthen ....... | F16C 29/123 297/411.37 |
| 8,899,651 B2 * | 12/2014 | Schulz ................... | B60N 3/102 296/24.34 |
| 9,085,265 B2 | 7/2015 | Hipshier | |
| 9,193,299 B2 | 11/2015 | Kodama | |
| 9,428,092 B2 * | 8/2016 | Bosma ................... | B60N 3/103 |
| 9,457,697 B2 * | 10/2016 | Bozio ................... | B60N 2/4646 |
| 9,713,972 B2 * | 7/2017 | Bozio ................... | B60N 2/4633 |
| 9,776,539 B2 * | 10/2017 | Lee ......................... | B60N 2/773 |
| 9,981,589 B2 * | 5/2018 | Senda ..................... | B60N 3/107 |
| 2002/0089217 A1 * | 7/2002 | Scheerhorn ............... | B60R 7/04 297/188.19 |
| 2003/0155786 A1 | 8/2003 | Kim et al. | |
| 2003/0184133 A1 | 10/2003 | Mic et al. | |
| 2004/0080173 A1 | 4/2004 | Niwa et al. | |
| 2004/0118851 A1 * | 6/2004 | Shinomiya ................ | B60R 7/04 220/345.1 |
| 2004/0130174 A1 * | 7/2004 | Laskey ................... | B60N 3/102 296/37.1 |
| 2007/0176449 A1 * | 8/2007 | Kukucka ................ | B60N 3/101 296/24.34 |
| 2007/0262632 A1 * | 11/2007 | Cody ..................... | B60N 2/793 297/411.35 |
| 2009/0072568 A1 | 3/2009 | Luginbill et al. | |
| 2011/0115246 A1 | 5/2011 | Beyer | |
| 2011/0121596 A1 | 5/2011 | Beyer | |
| 2011/0241371 A1 | 10/2011 | Hipshier | |
| 2013/0285603 A1 * | 10/2013 | Zeinstra ................ | H02J 7/0004 320/108 |

FOREIGN PATENT DOCUMENTS

| | | |
|---|---|---|
| EP | 1454789 A1 | 9/2004 |
| JP | H09169243 A | 6/1997 |
| JP | H10278682 A | 10/1998 |
| JP | 2000103289 A | 4/2000 |
| JP | 2003011728 A | 1/2003 |
| JP | 2004249958 A | 9/2004 |
| WO | 2008064210 A2 | 5/2008 |

OTHER PUBLICATIONS

Office Action from the Republic of Korea for Application No. 10-2015-7003828 dated Mar. 17, 2016 (with English translation summary).
International Search Report and Written Opinion for International Application No. PCT/US2013/050320 dated Dec. 11, 2013.
First Office Action from the State Intellectual Property Office of the People's Republic of China (including English Translation) dated Apr. 26, 2016.
Office Action for Japanese Patent Application No. 2015-521851 (including English Summary of "Notice of Reasons for Rejection") dated Jan. 26, 2016.
Claims from Response to First Office Action from State Intellectual Property Office of the People's Republic of China for CN Patent Application No. 201380047609.8 filed Sep. 12, 2016 (English translation) (2 pages).
Second Office Action from the State Intellectual Property Office of the People's Republic of China for CN Patent Application No. 201380047609.8 dated Feb. 8, 2017 (with English translation) (7 pages).
Claims from Response to Second Office Action from the State Intellectual Property Office of the People's Republic of China for CN Patent Application No. 201380047609.8 filed Apr. 21, 2017 (English translation) (2 pages).
Claims from Response to Third Office Action from the State Intellectual Property Office of the People's Republica of China for CN Patent Application No. 201380047609.8 filed Nov. 7, 2017 (English translation) (2 pages).
Supplementary Search Report from the State Intellectual Property Office of the People's Republic of China for CN Patent Application No. 2013800476098 dated Mar. 14, 2018 (translated) (2 pages).

* cited by examiner

VEHICLE INTERIOR COMPONENT

CROSS REFERENCE TO RELATED APPLICATIONS

The present application is a continuation of U.S. application Ser. No. 14/414,605 titled "ADJUSTABLE VEHICLE ARMREST AND TAMBOUR DOOR" filed Jan. 13, 2015.

The present application claims priority from and the benefit of and incorporates by reference in entirety of the following applications: (a) U.S. application Ser. No. 14/414,605 titled "ADJUSTABLE VEHICLE ARMREST AND TAMBOUR DOOR" filed Jan. 13, 2015; (b) International Application No. PCT/US2013/050320 titled "ADJUSTABLE VEHICLE ARMREST AND TAMBOUR DOOR" filed Jul. 12, 2013; (c) U.S. Provisional Patent Application No. 61/671,376 titled "ADJUSTABLE VEHICLE ARMREST AND TAMBOUR DOOR" filed Jul. 13, 2012.

FIELD

The present invention relates to a vehicle interior component. The present invention also relates to a console for a vehicle interior. The present invention further relates to an adjustable armrest with a tambour door.

BACKGROUND

It is known to provide vehicle interior components. It is also known to provide an armrest for the vehicle interior. It is also known to provide an adjustable armrest with a tambour door.

It would be advantageous to provide an improved adjustable armrest with a tambour door. It would also be advantageous for the improved adjustable armrest to adjust in length. It would also be advantageous for the tambour door to slide into a concealed space when the tambour door is opened to reveal a storage compartment with the armrest.

SUMMARY

The present invention relates to a console for a vehicle interior. The console comprises a support structure, a tambour door and an armrest comprising a first portion and a second portion. The second portion may be configured to increase the length of the armrest.

The present invention also relates to a console for a vehicle interior. The console comprises a support structure, a tambour door and an armrest comprising a storage volume. The armrest is configured for adjustment from a first state with the armrest comprising a first length to a second state with the armrest comprising a second length different than the first length.

DESCRIPTION

Figure 1:
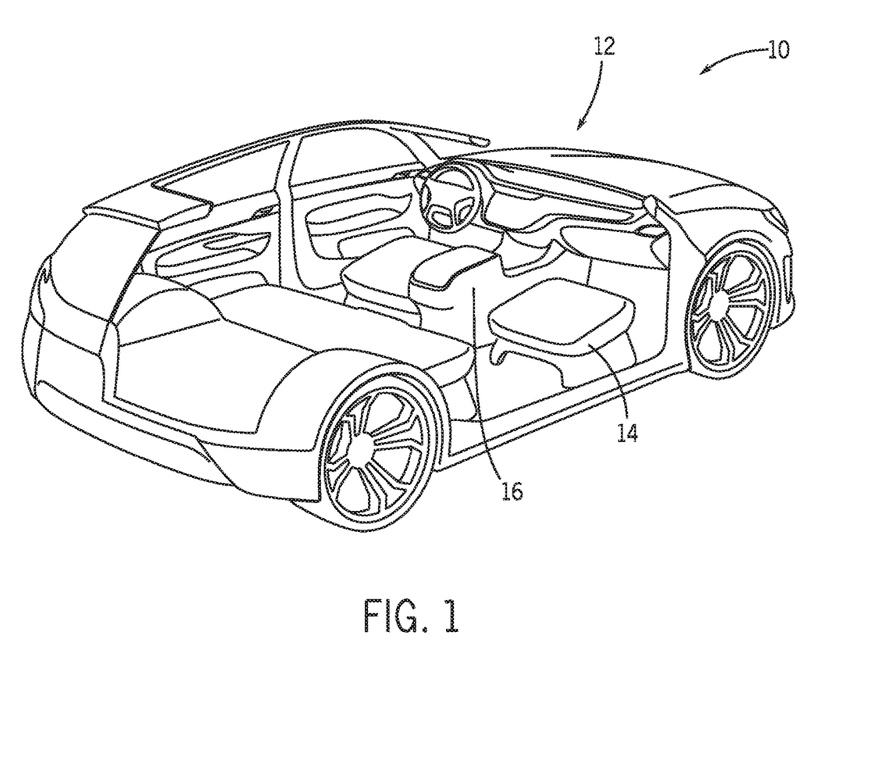
FIG. 1 is a schematic perspective view of a vehicle with an adjustable armrest according to an exemplary embodiment.

As shown schematically in FIG. 1, a vehicle 10 has an interior 12 with various interior components including seats 14 and a center console 16. Center console 16 provides storage compartments and an armrest system 18 with an armrest designed to be extendable and retractable for the use/convenience of the vehicle occupants. The armrest system is configured to provide access into one or more interior storage compartments (e.g. by use of a tambour door 28). According to an exemplary embodiment, movement of the tambour door 28 may expose and allow access to one or more of various electronic devices, charging ports (e.g. for mobile telephones), wireless power surfaces, switches, etc. According to an exemplary embodiment as shown schematically, the console is positioned between the front seats of the vehicle; armrests, tambour doors and consoles may be adapted to be positioned in the rear seats or other positions in a vehicle (e.g. in various positions within trucks, buses, aircraft, boats, etc.).

Figure 2:
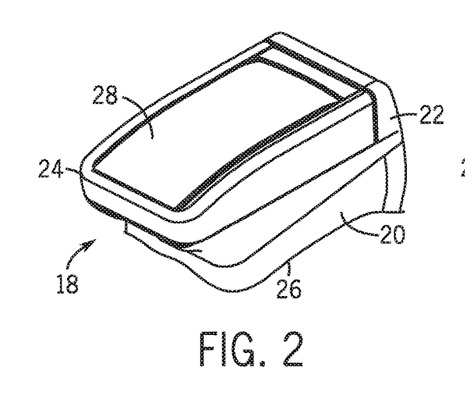
FIG. 2 is a schematic perspective view of the armrest in a retracted position according to an exemplary embodiment.
Figure 2A:
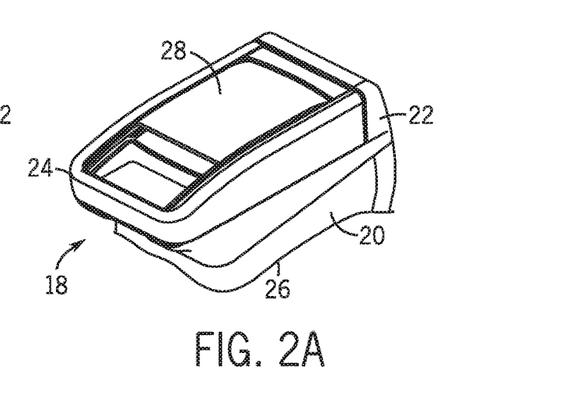
FIG. 2A is a schematic perspective view of the armrest with a tambour door in a partially open position according to an exemplary embodiment.

As shown schematically in FIG. 2, an armrest system 18 supported by the console may comprise a support structure 20; according to an exemplary embodiment support structure 20 may be part of the console or a sub-assembly may be formed and may be secured to the console during final assembly. According to an exemplary embodiment, armrest system comprises a stationary portion 22 (e.g. does not move); the armrest comprises movable portion 24 designed to allow the armrest to be extended and retracted. As shown schematically in FIG. 2, movable portion 24 is in the retracted position. Movable portion 24 may provide the functional armrest; support structure 20 may provide stationary portion 22 (and a base 26). Base 26 may comprise all or a portion of a console that is designed to be secured to the vehicle floor structure (e.g. floorboard) secured to a seat structure or secured to any other interior structure (e.g. securement point). As shown schematically in FIG. 2, tambour door 28 is installed over at least a part of movable portion 24 of the armrest system; tambour door 28 may be opened and closed by sliding. When tambour door 28 is opened the tambour door 28 is at least partially retracted (e.g. hidden) within support structure 20 passing through or into stationary portion 22. In the retracted position of the armrest system 18, the rear portion 34 of tambour door 28 is hidden within stationary portion 22 of the armrest and/or base 26.

Figure 3:
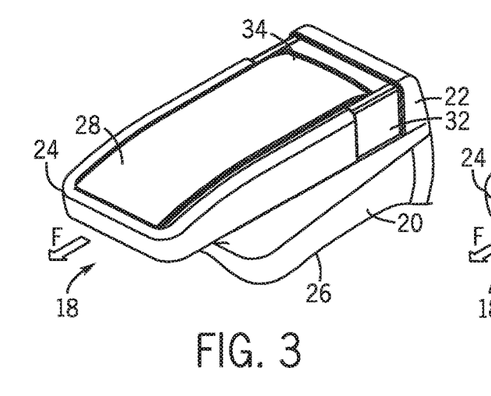
FIG. 3 is a schematic perspective view of the armrest in an extended position according to an exemplary embodiment.
Figure 3A:
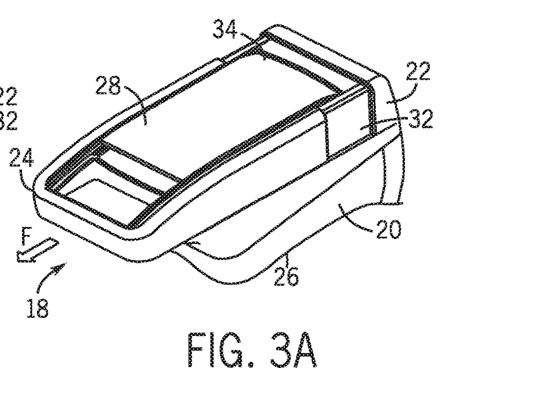
FIG. 3A is a schematic perspective view of the armrest with a tambour door in a partially open position according to an exemplary embodiment.

As shown schematically in FIG. 3, the armrest in the extended position. Movable portion 24 of the armrest system 18 may be caused to advance by pulling (e.g. changing the position) at which the vehicle occupant may rest his or her arm on the structure (movement toward the extended position is indicated by arrow F). See FIG. 3. According to an exemplary embodiment, when movable portion 24 is advanced to its extended position spaces exposed between stationary portion 22 and the rear edge of movable portion 24 are covered by closeout panels 32. The rear portion 34 of tambour door 28 may exposed from stationary portion 22 of the system by extension with movable portion 24.

According to an exemplary embodiment, a central tambour door 28 is provided between or within frame-like sides or edges of the armrest. According to an exemplary embodiment, the armrest system may provide a tambour door that does not extend as far forward or that may cover only a portion of the armrest; tambour door may fit under concealing portions of the armrest elements. The armrest itself (or any or all of the components) may be padded to provide added comfort. The components may be made of an injection moldable plastic material which may be assembled in any suitable conventional manner (via fasteners, adhesives, welding, etc.). Tambour door 28 (which forms part of the armrest) may provide a surface that serves as an armrest; the material and construction of tambour door 28 may provide a comfortable (e.g. cushioned) surface on which the vehicle occupant may rest between seats 14; occupants on either side of the assembly may rest arms on tambour door 28.

Figure 4:
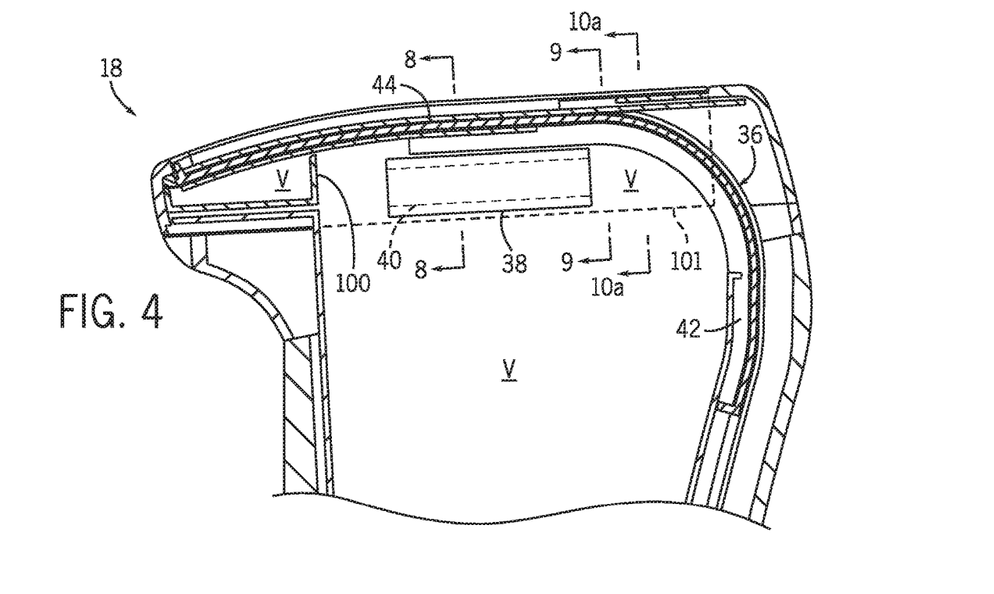
FIGS. 4 and 5 are schematic sectional views of the armrest showing a retracted position and an extended position of the internal components according to an exemplary embodiment.
Figure 5:
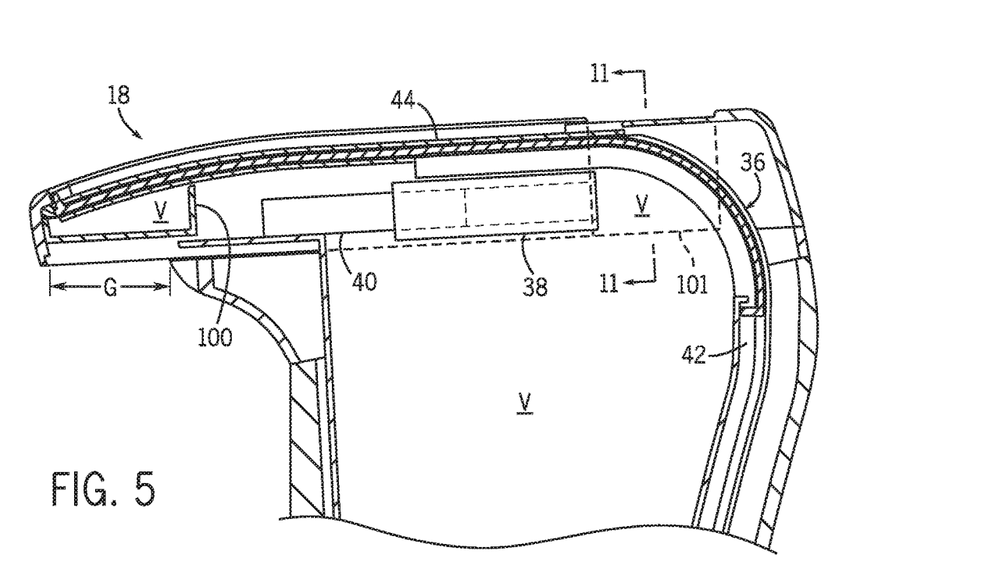

According to an exemplary embodiment, certain internal components of the new armrest and tambour door system are in retracted position (see FIG. 4) and extended position (see FIG. 5). The armrest system 18 may be disposed in a center console 16 or similar structure shown schematically in FIGS. 4 and 5. Structures are provided to support the armrest (movable portion 24 and tambour door 28) while allowing sliding motion of the armrest and tambour door 28 together or separately. Tambour door 28 may be fastened to the armrest in a forward position (by mechanically engaging detents, magnets, etc.). As the armrest slides forward and backward, tambour door 28 will follow movable portion 24 of the armrest; the operator may at any time urge tambour door 28 backward (independently of the armrest) to expose storage compartment 50. Opening of tambour door 28 may expose and allow accessible to one or more of various electronic devices, charging ports (e.g. for mobile telephones), wireless power surfaces, switches, etc. (e.g. positioned within a storage volume V of a first compartment 100 and/or a storage volume V of a second compartment 101).

According to an exemplary embodiment, the support structures shown in FIGS. 4 and 5 may be considered an overall slide assembly 36 that serves to support the armrest and tambour door 28. As shown schematically in FIG. 4, a stationary rail 38 is secured to support structure 20 while a sliding rail 40 (see FIG. 5) is engaged in the profile of stationary rail 38 and can move freely between the retracted position (hidden at least partially within stationary rail 38) (see FIG. 4) and the extended position (e.g. extended by a distance G) in which sliding rail 40 extends from but still supported by stationary rail 38 (see FIG. 5). Sliding rail 40 supports the armrest.

According to an exemplary embodiment, tracks are provided to support tambour door 28. According to an exemplary embodiment, stationary track 42 remains in place in support structure 20 and extends backward from the slidable armrest into support structure 20 (at a non-zero angle) vertically with a smooth bend to accommodate movement of tambour door 28. A sliding or movable track 44 is sliding support of tambour door 28 in the retracted position (see FIG. 4) and in the extended position (see FIG. 5); sliding or movable track 44 is also supported by sliding rail 40; tambour door 28 is supported indirectly by support structure 20 through the intermediary of sliding rail 40 and stationary rail 38.

Figure 6:
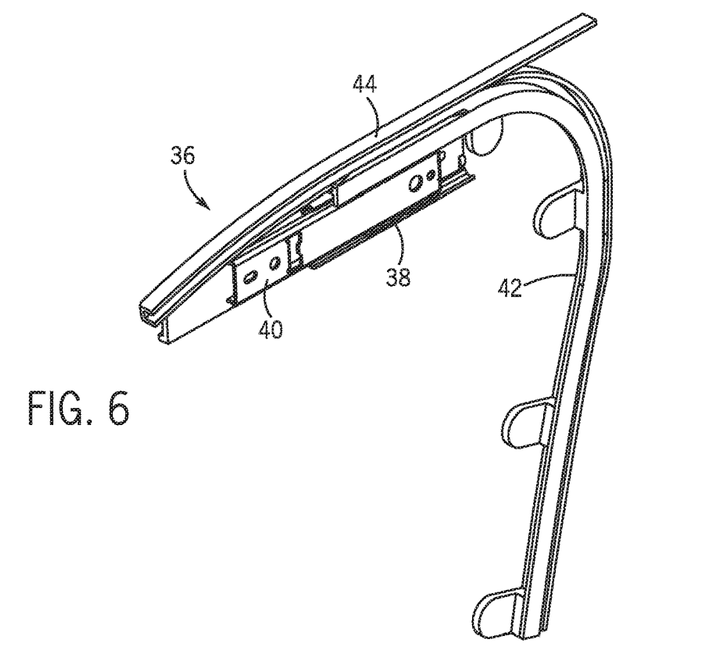
FIG. 6 is a schematic perspective view of the slide components and tracks used to support the armrest and a tambour door in the retracted position according to an exemplary embodiment.
Figure 7:
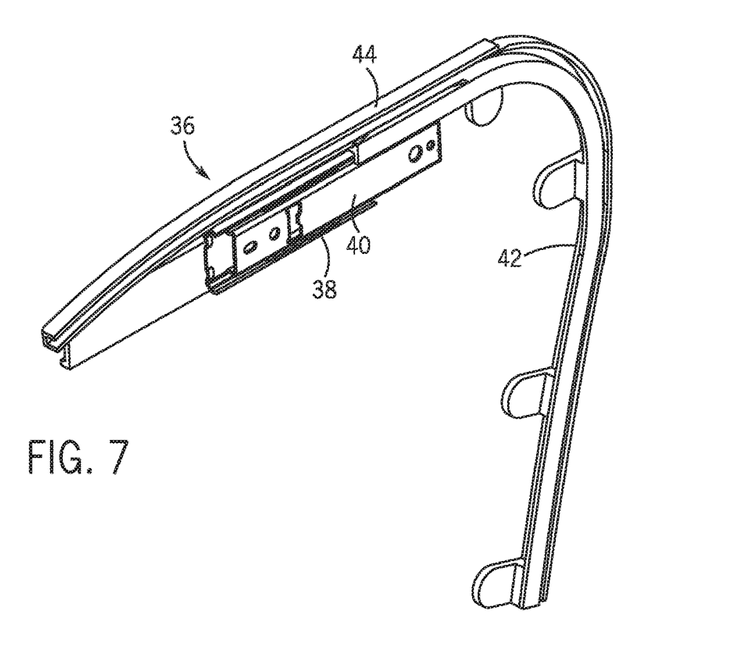
FIG. 7 is a schematic perspective view of the slide components and tracks used to support the armrest and a tambour door in the extended position according to an exemplary embodiment.

According to an exemplary embodiment, FIGS. 6 and 7 show the slide assembly 36. Stationary rail 38 is shown secured to a wall of support structure 20; sliding rail 40 is engaged with stationary rail 38; sliding rail 40 will be secured to the armrest and allow the armrest to be retracted.

According to an exemplary embodiment, stationary track 42 is supported by stationary rail 38; stationary track 42 has a smooth bend to guide tambour door 28 backward into support structure 20 (e.g. the console). Sliding or movable track 44 is supported by sliding rail 40 and is advanced and retracted with sliding rail 40 to provide continuous support of tambour door 28. Each of the track structures forms a channel 56 in which tambour door 28 is received and supported.

Figure 8:
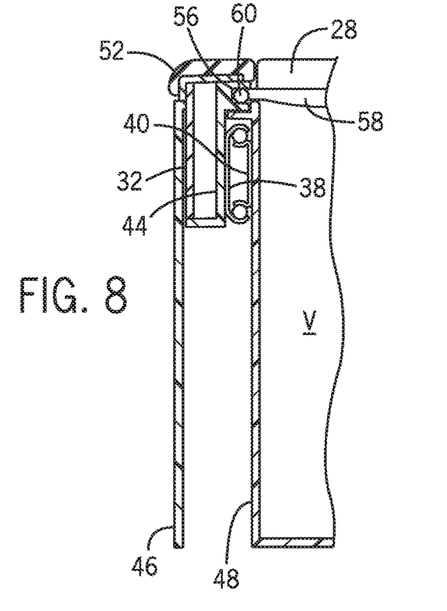
FIGS. 8 through 11 are schematic sectional views of the armrest showing the relative position of the assembly components according to an exemplary embodiment.

According to an exemplary embodiment, FIG. 8 is a cross sectional view of armrest 18 shown in FIG. 4. As shown schematically in FIG. 8 according to an exemplary embodiment, the sliding track and rails move forward to the point where the sliding track and stationary track 42 join; support structure 20 includes an outer wall 46 and an inner wall 48 with the slide assembly 36 according to an exemplary embodiment. A typical console may have symmetrical sides of similar constructions (each having inner wall 48, outer wall 46 and similar mirror-image slide assemblies) or asymmetrical construction. Within interior wall 48 at least one storage compartment 50 is defined. Various articles may be conveniently stored within support structure 20 or console. Tambour door 28 is supported above the storage compartment 50 by slide assembly 36. A corner piece 52 is provided; corner piece 52 may extend partially or fully across the armrest and may at least partially cover tambour door 28. Various user conveniences may be accessible upon movement of tambour door 28 (including various electronic devices, charging ports e.g. for mobile telephones, wireless power surfaces, switches, etc.).

According to an exemplary embodiment, FIG. 8 includes a ledge extending from the inner wall 48 toward the outer wall 46. Sliding track 44 interfaces with the ledge; sliding track 44 is supported by sliding rail 40. The ledge supports the upper extremity of sliding track 44. Sliding track 44 forms channel 56 that receives and supports tambour door 28; tambour door 28 comprises a series of ribs 58 which secures a cushioned finishing material. The ribs 58 terminate in bearings 60 (e.g. small balls) within channel 56. As tambour door 28 is displaced, the bearings 60 move forward and backward within channel 56. The entire structure may move forward or backward by movement of sliding track 44 with sliding rail 40.

Figure 9:
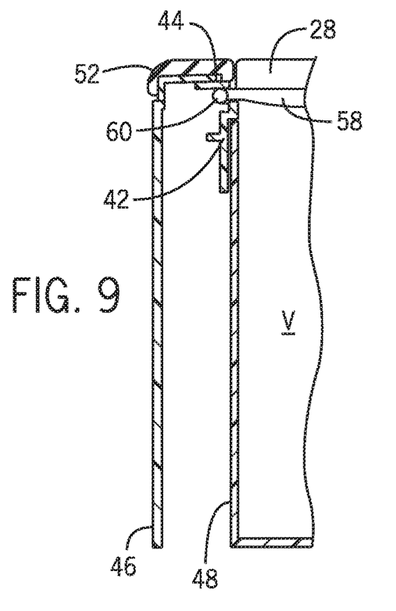

According to an exemplary embodiment, FIG. 9 is a cross sectional view of armrest 18 shown in FIG. 4. As shown schematically in FIG. 9, a portion of the door track is shown above the bearings 60 that aids in supporting tambour door 28 against escape in a vertical direction. Stationary track 42 becomes visible; stationary track 42 is at least partially supported according to an exemplary embodiment by inner wall 48.

Figure 10:
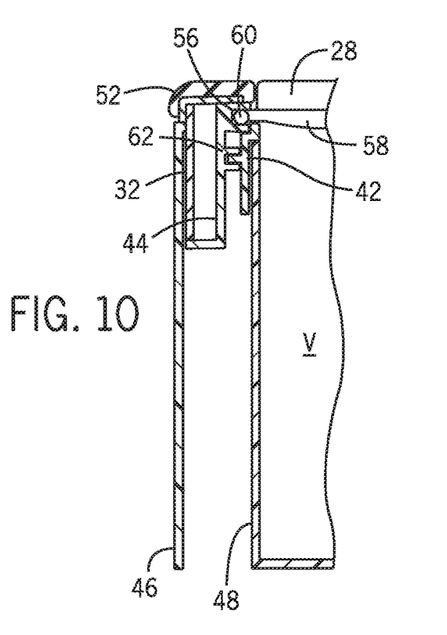

According to an exemplary embodiment, FIG. 10 is a cross sectional view of armrest 18 shown in FIG. 4. As shown schematically in FIG. 10, the same structure is at a backward position; stationary track 42 is visible along with sliding track 44. Stationary track 42 and sliding track 44 will interface by a channel 62 formed in sliding track 44. Also shown schematically in FIG. 10 is closeout panel 32 that covers the space between stationary portion 22 and movable portion 24 of the armrest system 18 as movable portion 24 is moved outwardly to its extended position.

Figure 11:
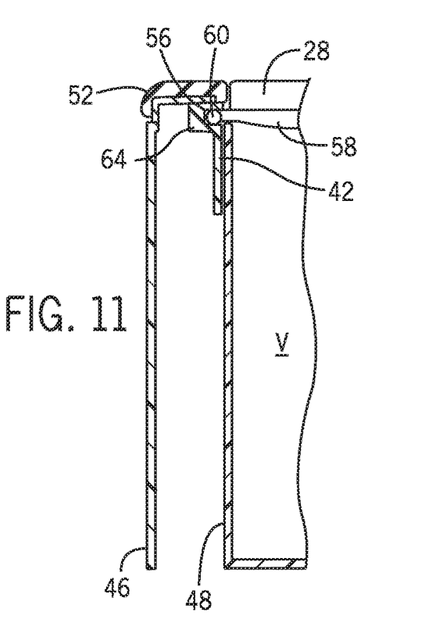

According to an exemplary embodiment, FIG. 11 is a cross sectional view of armrest 18 shown in FIG. 5. As shown schematically in FIG. 11 is the rear portion 34 of the assembly when the armrest is in its extended position; in the extended position stationary track 42 is visible (sliding track 44 having been advanced by movement of the armrest). A channel 64 is visible in stationary track 42 to support the rear portion 34 of tambour door 28; channel 56 and channel 64 support tambour door 28 along its length in all of the positions of the armrest and tambour door 28; tambour door 28 remains supported in the retracted position and the extended position of the armrest and in the opened position and closed position of tambour door 28 whether the armrest is extended or retracted.

Figure 12A:
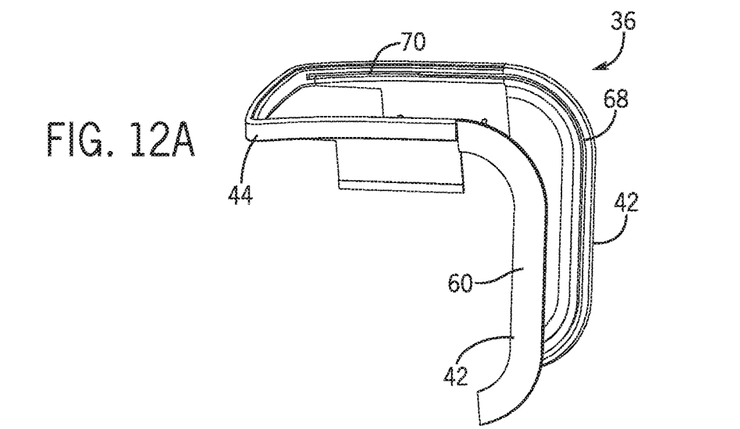
FIGS. 12A and 12B are schematic perspective views of an assembly for facilitating movement of the armrest according to an exemplary embodiment.
Figure 12B:
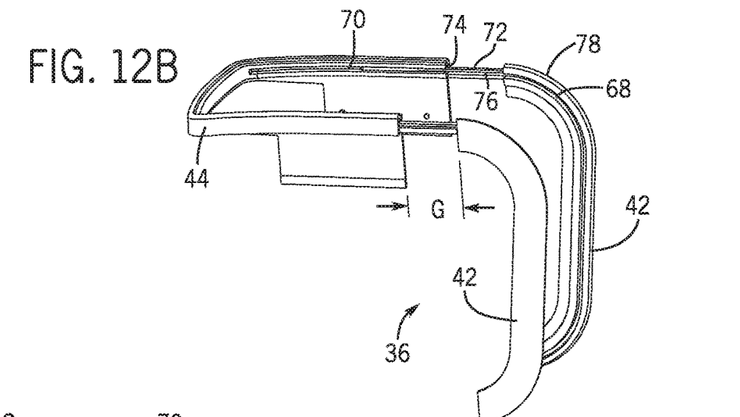
Figure 13A:
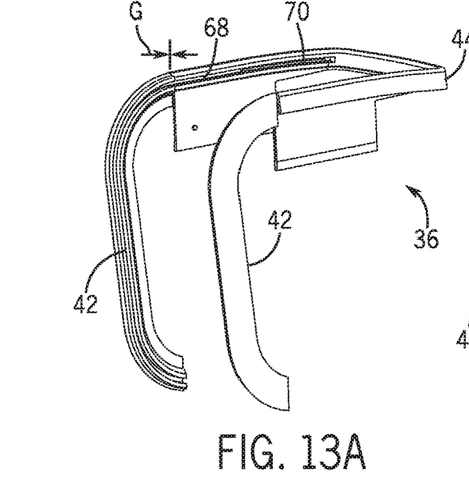
FIGS. 13A and 13B are schematic perspective views of an assembly for facilitating movement of the armrest according to an exemplary embodiment.
Figure 13B:
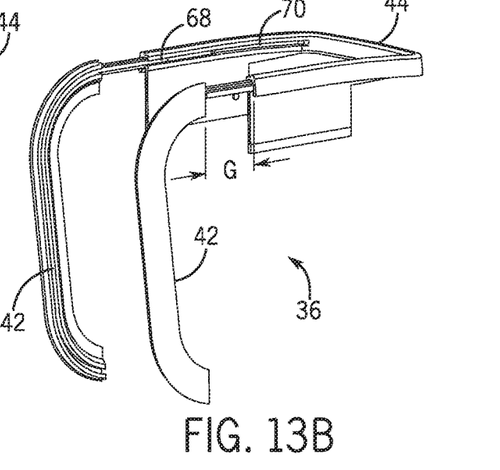

According to an exemplary embodiment, FIGS. 12 through 14 show a split track design for allowing extension and retraction of the armrest while supporting tambour door 28 in the retracted position and the extended position (and positions between). According to an exemplary embodiment, slide assembly 36 forms part of support structure 20; the (rearward) stationary track 42 interfaces with the (forward) sliding or movable track 44 (forward and rearward positions of the tracks could be reversed); a molded-in side panel is included in the stationary track 42 to facilitate mounting; slide assembly 36 has been removed for clarity as has tambour door 28. According to an exemplary embodiment, stationary track 42 has a groove 68 in which tambour door 28 will ride when assembled; groove 68 aligns with a similar groove 70 formed in sliding or movable track 44. FIG. 12B shows configuration in the extended position. According to an exemplary embodiment, a projection shown as extension finger 72 between stationary track 42 and sliding or movable track 44 is shown; extension finger 72 is molded as part of stationary track 42 (other arrangements and assemblies may be used). Extension finger 72 includes surfaces for supporting tambour door 28 for sliding between the open position and the closed position when the structure is in the extended position. According to an exemplary embodiment, sliding or movable track 70 has support grooves 74 that aid in supporting extension finger 72; extension finger 72 has an inner groove 76 that provides support for tambour door 28. According to an exemplary embodiment, the arrangement allows for a more rounded rear corner 78 than the previous arrangement. According to an exemplary embodiment, the overall structure allows for extension by a distance G dependent upon the length of the tracks and extension finger 72. (FIG. 13A shows the structure in the retracted position from an opposite side from that shown in FIG. 12A; FIG. 13B shows the same structure in the extended position from an opposite side from that shown in FIG. 12B.)

It is important to note that the construction and arrangement of the elements of the inventive concepts and inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the apparatus of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. A console for a vehicle interior comprising:
   a base comprising a support structure; and
   an armrest comprising a stationary portion fixed to the support structure of the base and a moveable portion;
   wherein the armrest comprises a tambour door; and
   wherein the moveable portion is configured to move relative to the support structure of the base to increase the length of the armrest.

2. The console of claim 1 wherein the moveable portion of the armrest slides with respect to the stationary portion.

3. The console of claim 2 wherein the tambour door is configured to slide with the moveable portion.

4. The console of claim 3 wherein the tambour door is further configured to slide with respect to the moveable portion.

5. The console of claim 4 wherein the tambour door is at least partially hidden within the stationary portion.

6. The console of claim 4 wherein the tambour door is configured to pass through or into the stationary portion when it slides with respect to the moveable portion.

7. The console of claim 4 wherein the tambour door is releasably fastened to the armrest by at least one of (a) a mechanically engaging detent; (b) a magnet.

8. The console of claim 1 wherein the armrest comprises a storage volume.

9. The console of claim 8 wherein the tambour door is configured to cover the storage volume.

10. The console of claim 9 wherein the support structure comprises a first rail configured to support the armrest and wherein the armrest comprises a second rail configured to slide with respect to the first rail to extend the length of the armrest.

11. The console of claim 10 further comprising a first track configured to support the tambour door and a second track configured to slide with respect to the first track to allow the tambour door to slide relative to the support structure and the armrest.

12. The console of claim 11 wherein the first rail supports the first track, the second rail supports the second track and the first track, the second track, the first rail and the second rail are configured to support the tambour door.

13. A console for a vehicle interior comprising:
   (a) a support structure;
   (b) a tambour door; and (c) an armrest comprising a storage volume;
wherein the armrest is configured for adjustment from (a) a first state with the armrest comprising a first length to (b) a second state with the armrest comprising a second length different than the first length;
wherein the support structure comprises a first rail configured to support the armrest and wherein the armrest comprises a second rail configured to slide with respect to the first rail to extend the length of the armrest; and
wherein the tambour door is configured to cover the storage volume in the first state and the second state.

14. The console of claim 13 wherein the tambour door is configured to slide with respect to the armrest to uncover the storage volume in the first state and in the second state.

15. The console of claim 13 wherein the tambour door is releasably fastened to the armrest by at least one of (a) a mechanically engaging detent; (b) a magnet.

16. The console of claim 13 further comprising a first track configured to support the tambour door and a second track configured to slide with respect to the first track to allow the tambour door to slide relative to the support structure and the armrest.

17. The console of claim 16 wherein the first rail supports the first track, the second rail supports the second track and the first track, the second track, the first rail and the second rail are configured to support the tambour door.

18. A console for a vehicle interior comprising:
(a) a support structure;
(b) a tambour door; and
(c) an armrest comprising a storage volume;
wherein the armrest is configured for adjustment from (a) a first state with the armrest comprising a first length to (b) a second state with the armrest comprising a second length different than the first length;
wherein the support structure comprises a first rail configured to support the armrest and wherein the armrest comprises a second rail configured to slide with respect to the first rail to extend the length of the armrest; and
wherein the tambour door is releasably fastened to the armrest by at least one of a mechanically engaging detent; a magnet.

19. The console of claim 18 wherein the tambour door is configured to cover the storage volume in the first state and the second state.

20. The console of claim 18 wherein the tambour door is configured to slide with respect to the armrest to uncover the storage volume in the first state and in the second state.

* * * * *